United States Patent [19]

Kollin

[11] 4,365,238

[45] Dec. 21, 1982

[54] VISUAL SIGNALLING APPARATUS

[76] Inventor: Adam Kollin, 28 E. Iroquois, Pontiac, Mich. 48053

[21] Appl. No.: 203,227

[22] Filed: Nov. 3, 1980

Related U.S. Application Data

[63] Continuation-in-part of Ser. No. 46,797, Jun. 8, 1979, abandoned.

[51] Int. Cl.³ .................. H04B 3/54; G01K 11/00
[52] U.S. Cl. .................. 340/521; 340/310 CP; 340/825.51; 340/332; 340/519; 367/197; 367/198; 340/310 A
[58] Field of Search ........ 340/310 R, 310 A, 310 CP, 340/148, 407, 538, 539, 519, 521, 332, 326, 825.51; 367/178, 197, 198, 199; 179/2 E, 1 C, 2 A, 1 VC, 2 C; 455/38, 344, 352, 108, 68, 228

[56] References Cited

U.S. PATENT DOCUMENTS

| | | | |
|---|---|---|---|
| 2,202,188 | 5/1940 | Cianchi | 340/310 R |
| 2,213,100 | 8/1940 | Cianchi | 340/310 R |
| 3,440,347 | 4/1969 | Spencer et al. | 340/310 CP |
| 3,611,363 | 10/1971 | McCrea | 340/519 |
| 3,613,064 | 10/1971 | Peterson | 340/371 |
| 3,781,836 | 12/1973 | Kruper et al. | 340/545 |
| 3,810,170 | 5/1974 | Zinsmeister | 340/521 |
| 3,827,038 | 7/1974 | Willis | 340/545 |
| 3,911,425 | 10/1975 | Munderyan | 340/326 |
| 3,925,763 | 12/1975 | Wadhwani et al. | 340/538 |
| 3,970,987 | 7/1976 | Kolm | 340/310 CP |
| 4,057,790 | 11/1977 | Fleming et al. | 340/311 |
| 4,117,462 | 9/1978 | Miller | 340/310 R |
| 4,134,108 | 1/1979 | Palmer et al. | 340/539 |
| 4,174,517 | 11/1979 | Mandel | 340/310 A |
| 4,237,449 | 12/1980 | Zibell | 340/148 |
| 4,243,973 | 1/1981 | Sandidge | 340/148 |

OTHER PUBLICATIONS

"Space Pagers", *Omni*, May 1979, p. 15.

*Primary Examiner*—James J. Groody
*Attorney, Agent, or Firm*—Basile, Weintraub & Hanlon

[57] ABSTRACT

An apparatus for visually signalling hearing impaired persons of the occurrence of an audible sound producing event. A plurality of sensing devices are individually located adjacent to a sound producing device, such as a telephone, doorbell, fire detector, etc., to sense the audible sounds produced by the activation of such devices. The output signals from the sensing devices are arranged in a predetermined priority ranking to enable a more important event to take precedence over an already occurring less important event. A sensing device transmits a signal to a central logic unit indicating the activation of one of the sound producing devices. The central logic unit identifies which sensing device sent the signal and transmits a predetermined sequence of output pulses associated with the particular activated device to a plurality of control modules. The control modules are each associated with an illuminating device, such as a light, and turn the associated light on and off in a predetermined sequence according to the received output pulses from the central logic unit to signal the hearing impaired person which sound producing event has taken place.

8 Claims, 8 Drawing Figures

VISUAL SIGNALLING APPARATUS

CROSS REFERENCE TO CO-PENDING APPLICATIONS

This application is a continuation-in-part of co-pending application Ser. No. 046,797, filed June 8, 1979, now abandoned, in the name of Adam Kollin and entitled "VISUAL SIGNALLING APPARATUS".

BACKGROUND OF THE INVENTION

1. Field of the Invention

This invention relates, in general, to visual signalling apparatus and, more specifically, to visual signalling apparatus responsive to audible sound for signalling persons having reduced or totally impaired hearing capabilities.

2. Description of the Prior Art

Persons having reduced or totally impaired hearing capabilities are at a distinct disadvantage since they are unable to respond to audible sounds normally encountered in every day living, such as those sounds associated with a doorbell, telephone, alarm clock, a baby's cry, fire and burgular alarms, etc. Not only is this an inconvenience but, in case of fire alarms, it obviously is potentially dangerous.

Until this time, there has been little available for those with moderate to total hearing loss to help fulfill their everyday needs. Such products that are presently available are single function devices that utilize a light to alert those with impaired hearing of the occurrence of some event. For example, it is known to connect a light to a doorbell in a house to provide a visual indication of the presence of someone at the door. However, such a system requires hardwired connections between the sound producing devices and the light which necessitates additional expense and time if the wiring is to be concealed or is unattractive and dangerous if the wiring is left exposed. Further, such hardwired connections are not usable with certain other devices, such as telephones or alarm clocks, without the use of special circuitry and additional components.

It is also known to place a standard microphone next to a sound producing device, such as a telephone, alarm clock or doorbell, to pick the audible sounds associated with the activation of such devices. The signals from the microphone are received by amplifier and relay circuitry which turns on a light in the home to give a visual indication to those with impaired hearing. Such systems have also included timing circuitry to cause the light to flash so as to attract the attention of persons in the area. Although effective, this type of system uses hardwired connections and is limited to a single function, that is, one light is associated with each particular sound producing device.

Another type of visual signalling system for those with impaired hearing capability, is disclosed in U.S. Pat. No. 3,810,170 and comprises a plurality of light panel displays which are located in all of the rooms of a building that might be occupied by deaf persons. Each light panel includes a plurality of different colored lights, each activated by an occurrence of a different event, such as a telephone call, or a knock at the door of the room. A high intensity strobe light is also included in each light panel which, when activated by the occurrence of one of the selected events, flashes at a high rate to attract the attention of the deaf person; with the status lights providing additional information as to which has occurred. The strobe light typically flashes once to indicate the occurrence of a normal event, such as a telephone call and flashes continuously to indicate an emergency condition, such as a fire. Although such a visual signalling apparatus is effective to alert people in a large building, it is apparent that a multitude of individual light panels are required and extensive wiring is necessary to connect each panel to a central control unit or to the individual input devices in each room.

Thus, it would be desirable to provide a visual signalling apparatus for persons with reduced or totally impaired hearing which provides a distinct visual indication of the occurrence of one of a plurality of sound producing events and which overcomes the problems of prior art signalling systems. It would also be desirable to provide a visual signalling apparatus that may be easily installed in the house or building occupied by people with impaired hearing capability. Also, it would be desirable to provide a visual signalling apparatus which uses conventional house lights to provide the visual signal. It would also be desirable to provide a visual signalling apparatus that may be installed without the need for additional wiring in houses and buildings. Finally, it would be desirable to provide a visual signalling apparatus that may be easily changed and moved to fit a person's individual needs and lifestyle.

SUMMARY OF THE INVENTION

Herein disclosed is a novel apparatus for visual signalling hearing impaired persons of the occurrence of an audible sound producing event. A plurality of sensing devices are individually mounted adjacent to sound producing devices, such as a telephone, doorbell, fire detector, etc. The sensing devices transmit a distinct signal to a central logic unit upon detecting the presence of audible sounds produced by the particular sound producing device or event associated therewith. The central logic unit receives the signals from the sensors and identifies which sensor was activated. The central logic unit then transmits, preferably through the electrical power conductors of a house or building, an output signal which contains distinct information for each different sound producing device or event specifying the sequence of on and off flashes of the house lighting so as to signal to the hearing impaired persons which sound producing event is taking place.

The output signal from the central logic unit is received by control modules which are preferably plugged into the electrical outlets in the house or building and into which the house lighting is plugged. Each control module, in response to the received signal from the central logic unit, switches the lights connected thereto on and off in the predetermined sequence or pattern assigned to the sound producing device or event that is occurring to provide a distinct visual signal to the hearing impaired person.

The novel visual signalling apparatus of this invention provides a heretofore unavailable capability to alert hearing impaired people of the occurrence of sound producing events. The visual signalling apparatus consists of modular units which provide a distinct visual indication of the occurrence of one of a plurality of sound producing events normally encountered in a house or building but, which previously were not able to be easily and economically detected by persons having a partial or total hearing loss. The module units can be simply and quickly installed in a typical house or building and, furthermore, the apparatus preferably utilizes existing house wiring and lighting to provide the visual indication to the hearing impaired person. The sensing units and control modules are small in size and readily movable so as to enable their placement in any desired location within the house. Further, the sensors are programmed in a predetermined priority ranking such that a more critical or dangerous event, such as a fire, will take precedence over an already occurring lower ranking event to provide greater security and a faster indication of the occurrence of the events to the hearing impaired person.

DESCRIPTION OF THE DRAWING

The various features, advantages and other uses of this invention will become more apparent by referring to the following detailed description and drawing in which.

DESCRIPTION OF THE PREFERRED EMBODIMENTS

Figure 1:
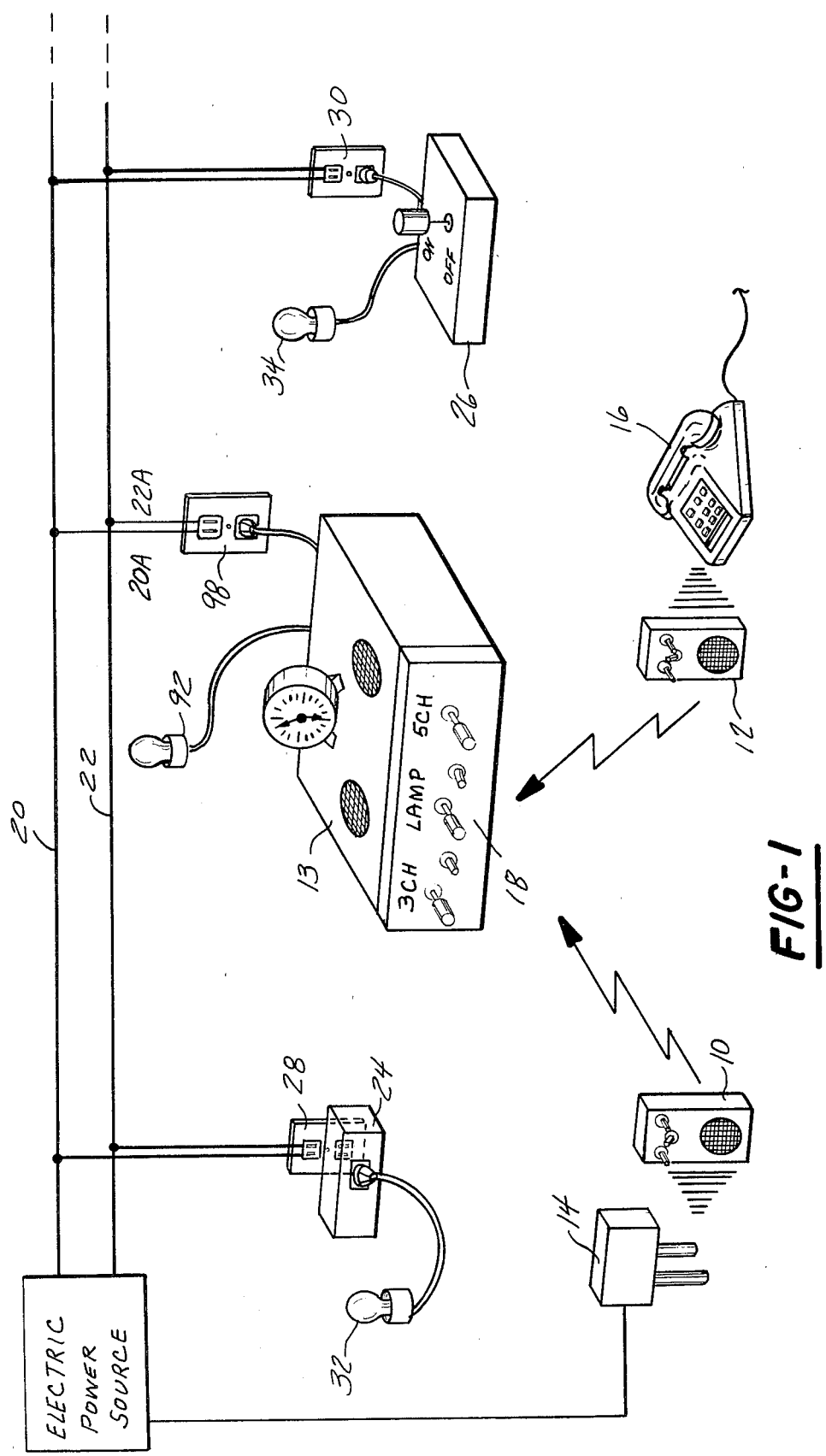
FIG. 1 is a pictorial representation of the installation of a visual signalling apparatus constructed according to the teachings of this invention in a typical house or building.

Throughout the following description, identical reference numbers are used to refer to the same component shown in multiple figures of the drawing.

Referring now to the drawing, and to FIG. 1 in particular, there is shown a pictorial representation of the installation of a visual signalling apparatus constructed according to the teachings of this invention in a typical house or building. In general, the visual signalling apparatus of this invention comprises a plurality of sensing means, such as sensor modules 10 and 12, which are individually mounted adjacent to a specific sound producing device, such as a doorbell 14 or a telephone 16. For simplicity, only two sensor modules 10 and 12 are illustrated and described herein; it being understood that additional sensor modules may be utilized to sense the sounds produced by other sound producing devices or events, such as fire detection means, a baby's cry, a burglar alarm or a knock on a door. Each sensor module, such as sensor module 10, includes a sensitivity control, as described hereafter, so as to enable the range of audible sounds detected to be set for a particular sound producing device. In this manner, each sensor module detects only the sounds produced by its associated sound producing device. Upon receiving an audible sound within the selected range, the sensor modules 10 and 12 transmit a signal to a central logic unit 18.

The central logic unit 18 includes a receiver section which receives the signal and identifies which sensor was activated. The central logic unit 18 then transmits a unique output signal comprising a distinct series of pulses assigned to the activated sensor and sound producing device or event through the electrical power conductors 20 and 22 of the house to a plurality of control modules, such as control modules 24 and 26. The control modules 24 and 26 are plugged into conventional electric outlets 28 and 30, respectively, so as to be connected to the house power conductors 20 and 22. The control modules receive the output signal from the central logic unit 18 and switch an illuminating means, such as a conventional house lamp, shown symbolically at reference numbers 32 and 34, on and off according to the series of pulses received from the central logic unit 18. In this manner the flashing pattern of the lights 32 and 34 provides a visual indication to a person having impaired hearing capability which of the sound producing events is occurring.

Figure 2:
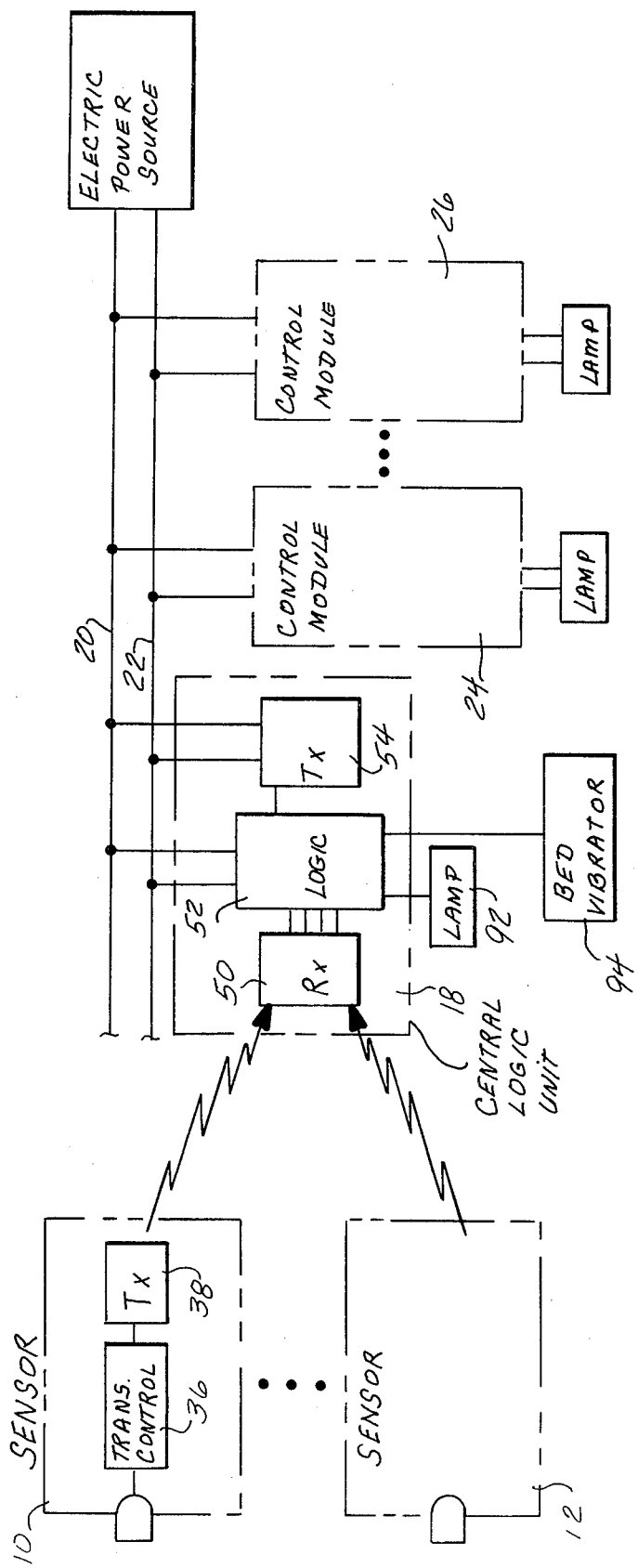
FIG. 2 is a block diagram of the visual signalling apparatus shown in FIG. 1.
Figure 3:
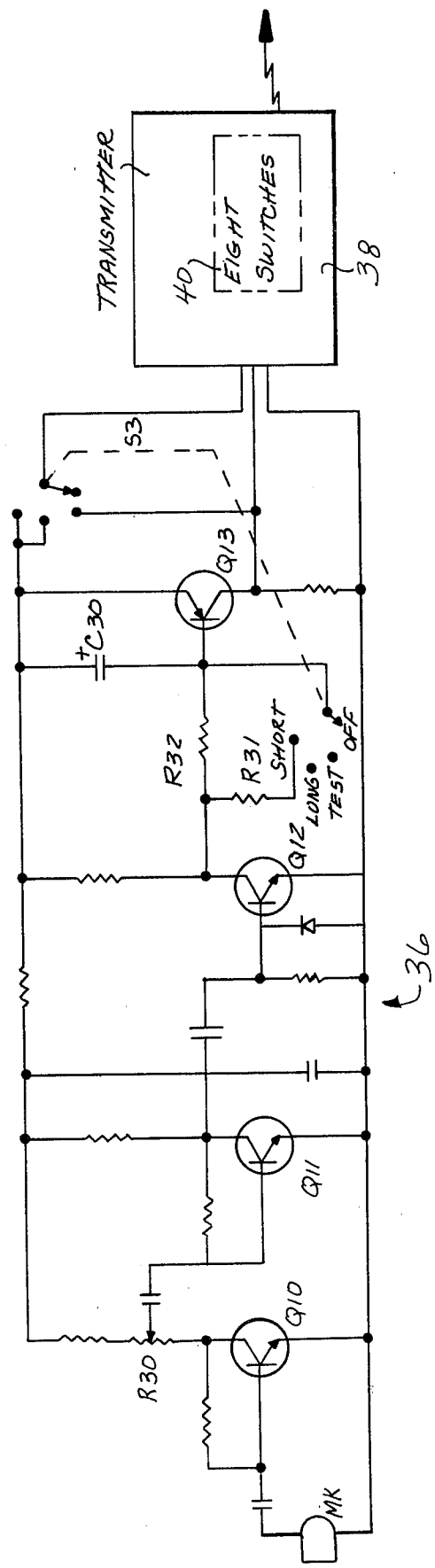
FIG. 3 is a schematic diagram of one of the sensing devices shown in FIG. 1.

Referring now to FIGS. 2-7, there is shown block and detailed schematic diagrams of the various components forming the visual signalling apparatus of this invention. As shown in FIG. 2, and in greater detail in FIG. 3, the sensing means, such as sensor modules 10 and 12, comprises a conventional microphone MK which receives audio signals from the sound producing devices next to which the sensor module is mounted. The audio signals picked up by the microphone MK are input to a transmitter control circuit 36 which causes a transmitter 38 to generate a predetermined radio frequency signal. As shown in FIG. 3, the transmitter control circuit 36 includes a first transistor Q10 which amplifies the input signal received from the microphone MK. The amplified signal from transistor Q10 is input to a detector transistor Q11 which includes a suitable sensitivity control comprising an adjustable potentiometer R30 which adjusts the range of amplitudes at which the detector transistor Q11 will be triggered. Upon receiving a signal within the selected range, transistor Q11 causes transistor Q12 to generate a pulse output. The output of transistor Q12 is connected through an RC network formed of resistors R31 and R32 and a capacitor C30 to a transistor Q13. The capacitors C30 integrates the audio output from transistor Q12 to provide a DC signal to switch transistor Q13 to a conducting state when the preselected audio input is received by the sensor modules.

As shown in FIG. 3 the sensor module includes a multiposition selector switch which enables the sensor to be turned off or to be manually tested. In addition, the sensor may be set to detect either short or long duration sounds thereby further improving the selectivity of the range of signals that will activate the sensor module. When the selector switch is set to the long position, the input signal to the sensor module must be present for a predetermined period of time before the sensor will be activated. When the selector switch is moved to the short position, resistor R13 is connected to the RC network and causes shorter duration input signals, such as those associated with a knock on the door, to be detected. In normal operation, the selector switch in each sensor module is set to either the short or long position depending on the particular sound producing device or event associated with the sensor.

As noted above, any conventional microphone may be used to practice this invention. In use, a microphone having a wide frequency response range has been described above. The amplification circuitry described above is responsive only to sound detected by the microphone which have a predetermined duration and intensity, i.e., the magnitude of the sound pressure wave produced by the particular event or device. The microphone is placed next to a predetermined sound producing event or device, such as a telephone, doorbell or smoke detector. Its sensitivity is adjusted so as to correspond with the particular sound intensity produced by the activation of the selected event or device. In addition, the long or short duration circuitry is also adjusted to correspond to the particular event. In this manner, the microphone and associated circuitry forms a means for sensing the audible sounds resulting from the occurrence of one of a plurality of predetermined events to the exclusion of the occurrence of other predetermined events which produce sound waves having different sound intensity and duration.

It will also be understood that any other type of microphone and amplication circuitry may be utilized in practicing this invention to detect the audible sounds produced by the occurrence of one of a plurality of predetermined events. Thus, a microphone which is responsive only to a particular narrow band of audible sound frequencies may be used to detect the occurrence of one of the predetermined events. The above-described microphone and amplification circuitry is provided by way of example, and not limitation, to clarify and present a clearer understanding of the present invention.

Upon receiving an audio input in the selected range, as described above, the transmitter control circuit 36 of the sensor modules will generate an output pulse through transistor Q13 to a convention transmitter 38. According to the preferred embodiment of this invention, the transmitter 38 is a transmitter sold by Linear Corporation, Englewood, California, model number D29. The transmitter 38 includes eight switches 40 which provide the capability of 256 distinct codes or addresses for each sensor module. According to the preferred embodiment of this invention, six of the eight switches 40 in each sensor utilized in a particular house are set to the same code or pattern to distinguish the sensors associated with one house from those that may be utilized in adjacent buildings. The two remaining switches are set to one of four distinct codes thereby generating in conjunction with the other six switches an eight bit digital address identifying one of four sensors.

The switches 40 causes a high frequency carrier signal 305 MHz in this invention, to be switched on and off according to the state of the switches to generate digital pulses identifying the particular sensor. The transmitter 38 transmits the eight bit amplified modulated digital pulse burst approximately ten times during each half second. The transmitter 38 also includes timer circuitry which repeats the eight pulse bursts at one half second intervals during every thirty second period as long as the audio input is present.

Although radio frequency transmitters and receivers are shown and preferred, hard wired connections and suitable circuit changes to link the sensors and the central logic unit are also useable within the scope of the teachings of this invention.

Referring now to FIGS. 2, 4, 5 and 6, there is shown the detailed circuitry of the central logic unit 18. The central logic unit 18 is connected to a conventional electrical outlet as shown in FIG. 1, so as to receive power from a suitable electric source 100 through house conductors 20 and 22 and wires 20A and 22A. This power is input into a first transformer D1, shown in FIG. 5 and a second transformer D2, which through voltage regulator 102 provides the necessary low level 12 volt signal to the electronic components in the central logic unit 18. The central logic unit 18 also includes a suitable receiver 50 for detecting the output signals transmitted from each sensor module, such as sensors 10 and 12. The receiver 50 may be of standard construction, such as one sold commercially by Linear Corporation, model no. DC4. Preferably, the receiver 50 is a four channel digital receiver capable of receiving and identifying output signals from four sensor modules. Accordingly, the receiver 50 includes four sets of eight switches, each set to the particular code programmed into the switches 40 in one of the sensor modules utilized within a house.

In operation, the receiver 50 receives signals from one of the four sensor modules and energizes one of four output lines depending upon which sensor module is activated. The output from the receiver 50 is input to logic circuitry 52 which identifies which sensor has been activated. Although the visual signalling apparatus of this invention is described as utilizing four sensors, additional sensors associated with identical sound producing devices, such as several fire detectors or telephones, may be connected in parallel so as to provide an output signal to the receiver section 50 of the central logic unit 18 upon the activation of any one of the identical sound producing devices or events.

Figure 6:
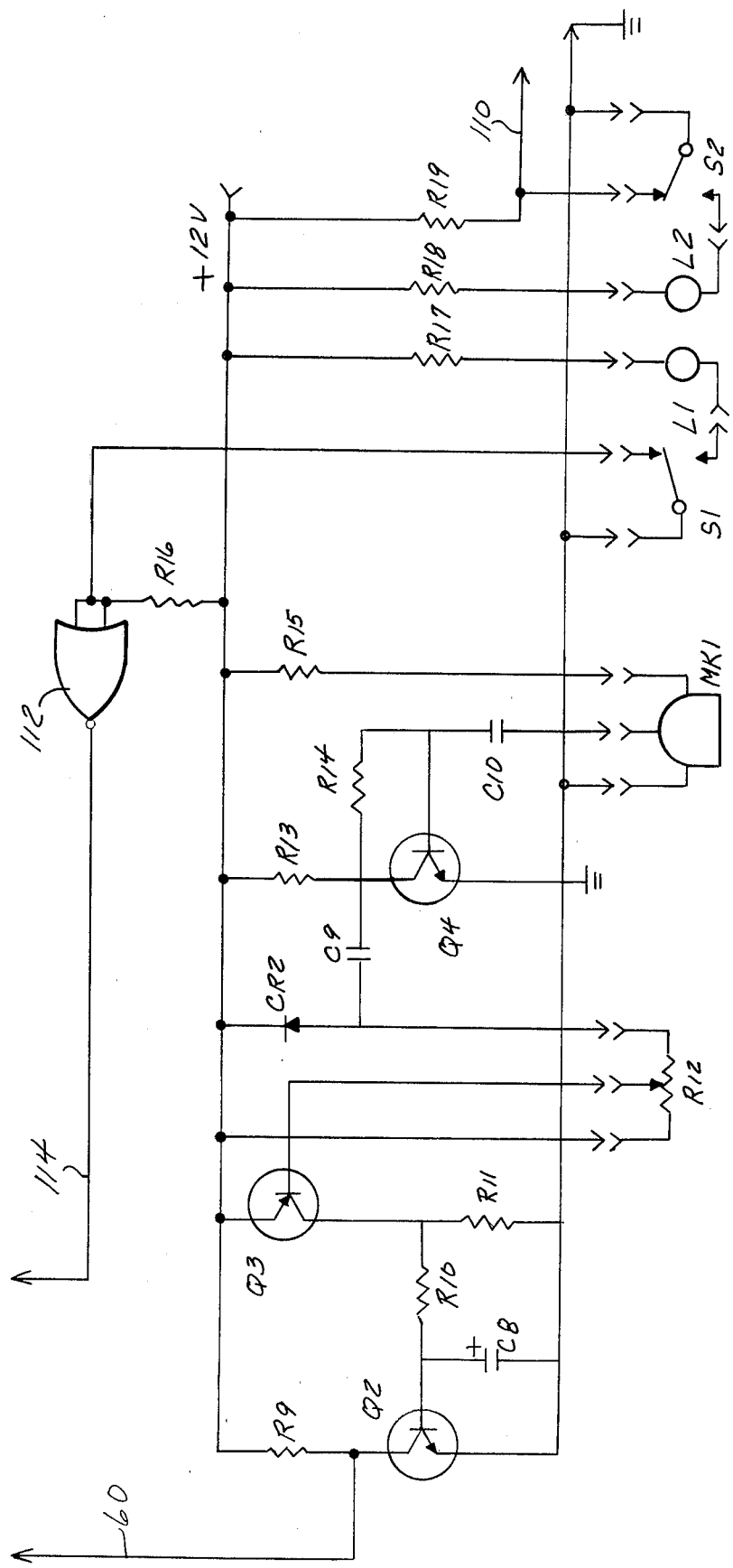

In addition to the four remote sensors, the central logic unit 18 includes an internal sensor 13, FIG. 1, to detect sounds produced by a device located adjacent to the central logic unit 18. These sounds are detected by a microphone MK1, as shown in FIG. 6. The audio signals detected by the microphone MK1 are amplified by transistor Q4 and detected by transistor Q3 whose detection range is set by an adjustable potentiometer R12. When an appropriate input signal has been detected by transistor Q3 transistor Q2 is switched to a conductive state thereby transmitting a signal on control line 60 to the timer circuitry shown in FIG. 4.

Figure 4:
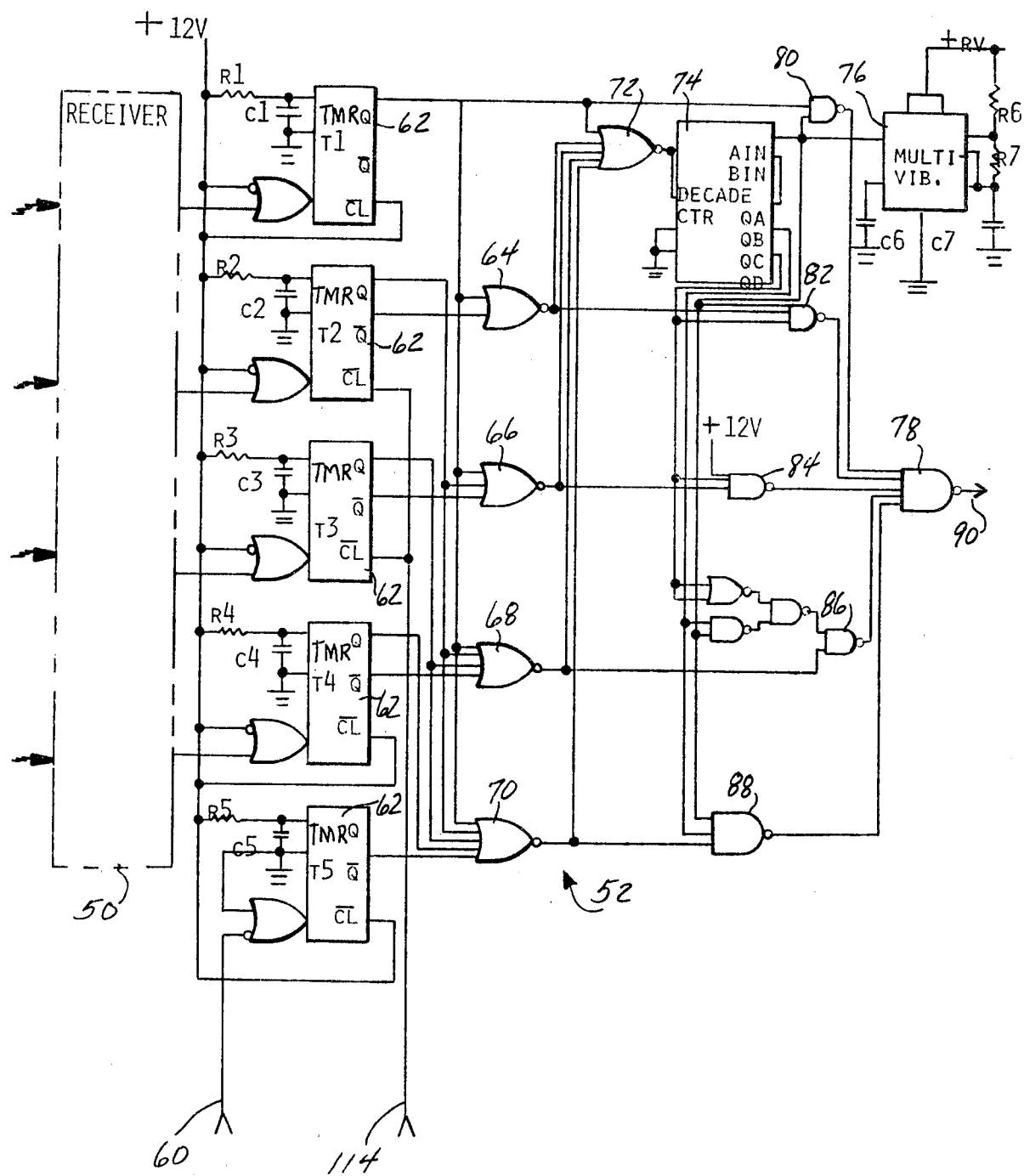
FIGS. 4, 5 and 6 are schematic diagrams of the central logic unit shown in FIG. 1.

As shown in FIG. 4, the four outputs from the receiver 50 and the output from the internal microphone MK1 on control line 60 are each input to timers 62. Each timer 62 includes a suitably selected resistor and capacitor such as resistor R1 and capacitor C1 for timer T1, which determines the time period of each timer 62. According to the preferred embodiment of this invention, the resistor and capacitor are chosen to provide a thirty second time period such that the output from each timer 62 will be present for thirty seconds even though the input from the receiver 50 has been deactivated after one half second. If the detected audio signal is still present after the initial thirty second time period has expired, the receiver 50 will generate another input pulse thereby re-energizing the associated timer 62.

According to the preferred embodiment of this invention the outputs from the various sensors are arranged in a predetermined priority ranking such that a more critical event, such as a fire, will take precedence over a lower ranking, already occurring event, such as a telephone. Accordingly, the sensor adjacent to a fire detector is associated through the receiver 50 with timer T1, a telephone sensor is associated with timer T3. The sensor to detect a baby's cry is associated with timer T4 and the internal sensor 13 in the central logic unit 18 is connected to timer T5. Although the above priority ranking is preferred, it may be easily altered by simply changing the sensor programmed for a fire detector to another location adjacent to a different sound producing device, such as a telephone or doorbell.

The inverted and non-inverted outputs Q and Q, respectively, from the timers 62 are connected, as shown in FIG. 4, to NOR gates 64, 68 and 70 to provide the desired priority ranking. The outputs of the NOR gates 64, 66, 68 and 70 are input to NOR gate 72; the output of which is connected to the inhibit input of a decade counter 74. During normal operation, when no sound producing device is activated, the output of the NOR gate 72 will be at a high logic level thereby inhibiting the output of the decade counter 74. When one of the predetermined sound producing events takes place, the output of NOR gate 72 will drop to a low logic level thereby momentarily resetting the decade counter to zero and starting the counting sequence of the counter 74.

Clock pulses are input to the decade counter 74 from a multivibrator 76 which includes suitable circuitry to provide pulses at the rate of three per second. Thus when activated, the output from the decade counter 74 will change state at the rate of three times per second.

According to the teachings of this invention, the visual signalling device system flashes the lights in the house, as described hereafter, in a distinct pattern for each different sound producing event that takes place in the house so as to enable the person having impaired hearing capabilities to identify quickly and easily which of the sound producing events is taking place. The flashing codes are generated by suitable switching circuitry in conjunction with the output pulses from the multivibrator and the decade counter 74.

In describing the various flashing codes, the terms, "short" and "long" pulses or periods are used. These terms refer to the period of the output signals from the multivibrator 76. As noted previously, the output of the multivibrator 76 is a squarewave which alternately pulses between high and low voltage levels. One period of the multivibrator 76 output comprises one high and one low voltage level transition. The term "short" thus refers to a pulse having a pulse width equal to one-half of the period of the multivibrator 76 output or one of the high or low voltage level states. The term "long" refers to a pulse having a pulse width equal to one entire period of the multivibrator 76 output signal.

Figure 8:
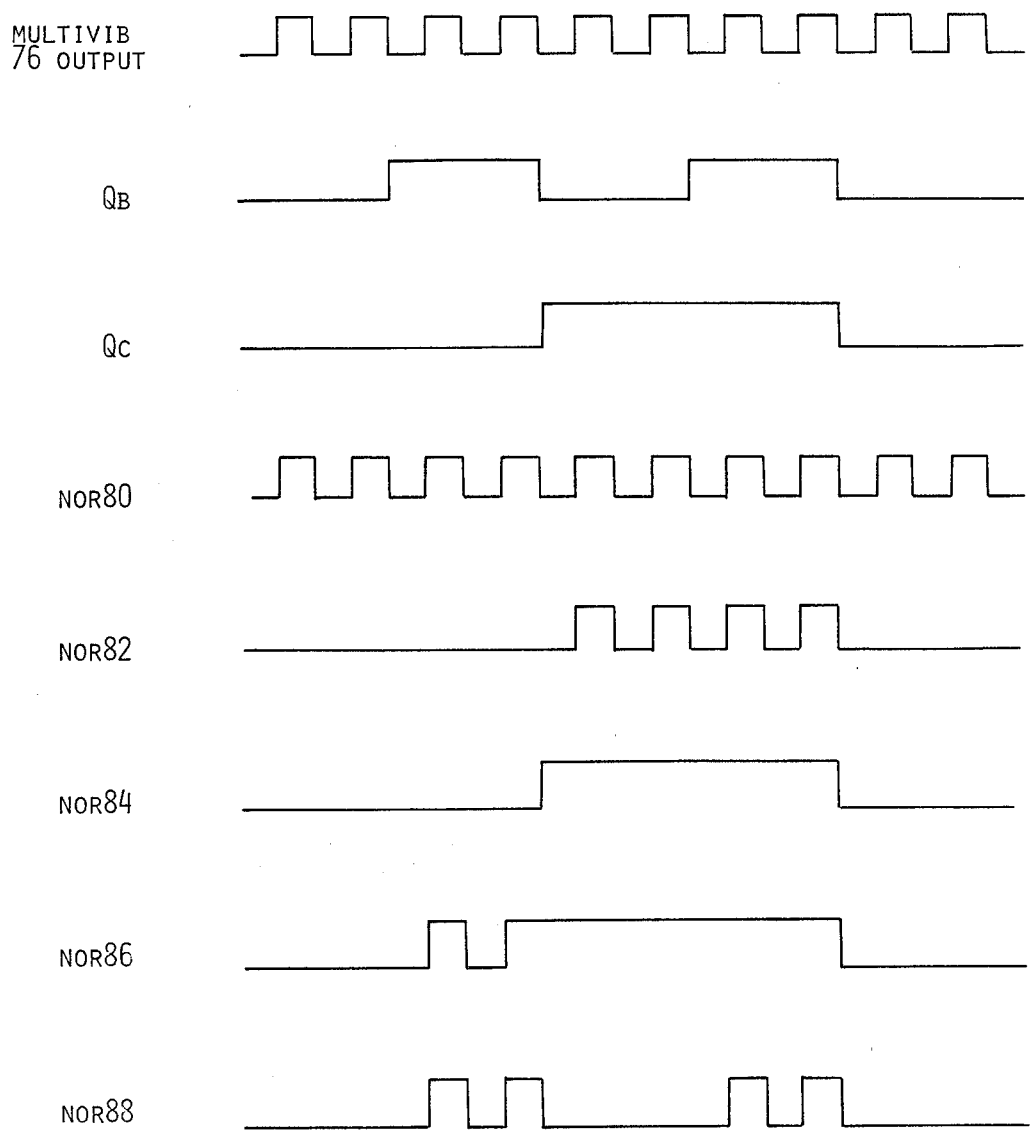
FIG. 8 is a waveform diagram of the various pulse patterns used to control the sequence of changes of state of the lights.

In order to distinguish which sound producing event has taken place, different codes or patterns of light flashes are assigned to each different sound producing device or event in the house. Thus, when the sensor associated with a fire detector is activated by the production of audible sounds by the fire detector, the central logic unit 18, through the decade counter 74, multivibrator 76 and NOR gate 80, provides a predetermined series of pulses at the outputs of the NOR gate 80, as shown in FIG. 8, which will include one short high voltage level pulse, one short low voltage level pulse, which are repeated continuously. The detection of the ringing of a telephone will produce four short on and four short off alternating pulses followed by six long off pulses. A doorbell ring or knock is indicated by four long on and six long off alternating pulses. When a person's voice, such as a baby's cry, has been detected, a pulse train comprising one short one and one short off, five long on and four long off alternating pulses is generated. Finally, the detection of audible sounds by the internal sensor 13 of the central logic unit 18 will be indicated by two short on, two short off, two long off, two short on, two short off and four long off alternating pulses.

It should be noted that the above-described pulse patterns are described with respect to one ten pulse output from the multivibrator 76. As noted previously, the timers 62 produce an output for thirty seconds upon activation. Thus, the above-described pulse patterns are repeated for thirty seconds at the rate of three pulses per second.

These flashing codes are generated by the switching circuitry shown in FIG. 4 which provides inputs to NAND gate 78. In general, the output of the decade counter 74 and the output of the multivibrator 76 are grouped together as shown in FIG. 4, as inputs to NAND gates 80, 82, 84, 86 and 88, the output of which are inputs to NAND gate 78. Thus, upon the occurrence of one of the predetermined sound producing events, the output of the NAND gates 80, 82, 84, 86 and 88 will change states in accordance with the input signals thereto which will cause the output of NAND gate 78 to follow the series of pulses generated by the one of the NAND gates 80, 82, 84, 86 and 88.

Figure 5:
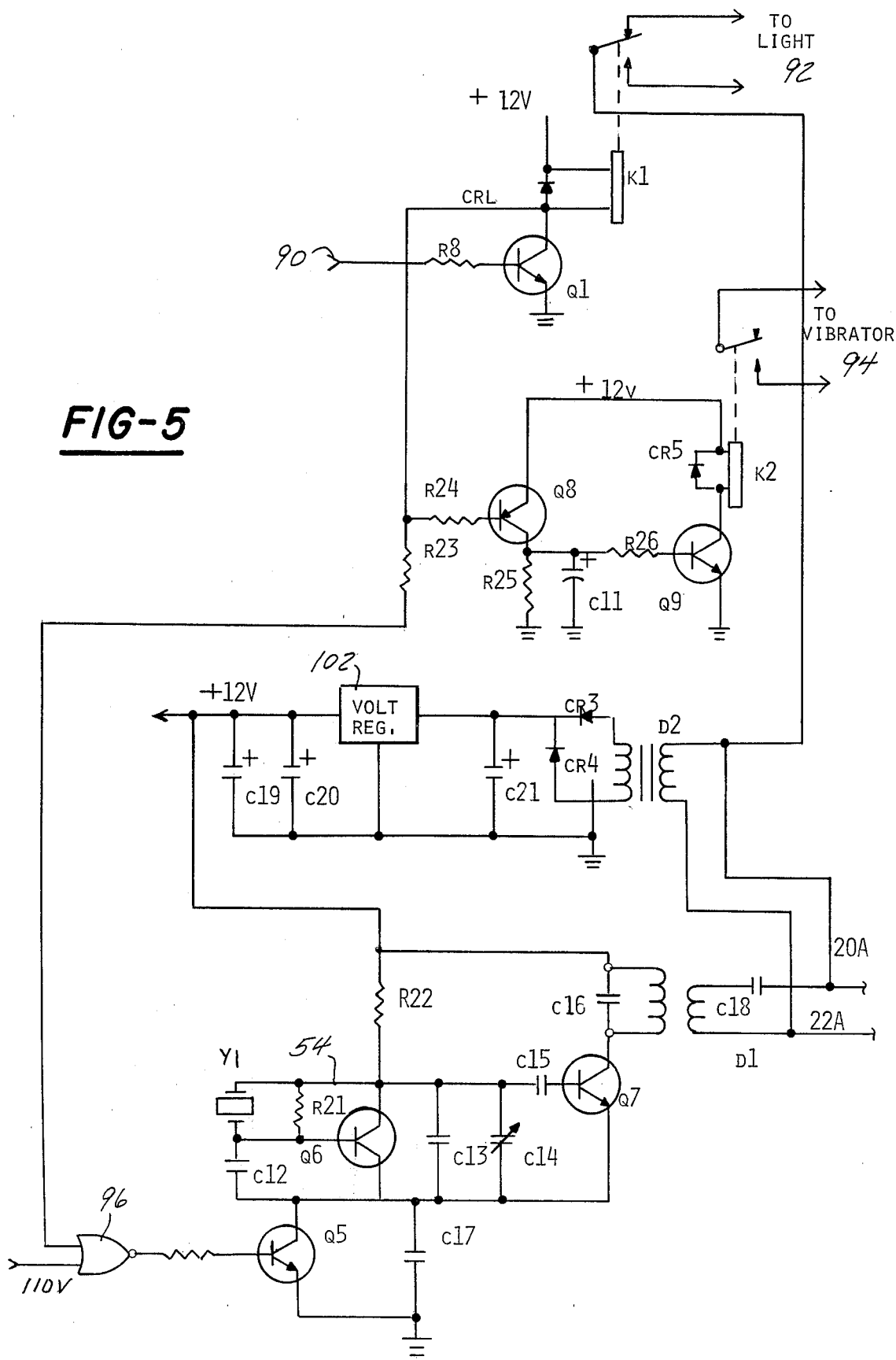

The output of NAND gate 78 is connected by a control line 90 to transistor Q1, FIG. 5. Thus, transistor Q1 switches between conductive states in accordance with the changes in the output of NAND gate 78 as described above. When transistor Q1 is switched to the conductive state, relay K1 is energized. Relay K1 has associated therewith a contact which controls the connection of power to a light 92 which is plugged into the central unit 18. In addition, the output of transistor Q1 is input to a circuit comprising transistors Q8 and Q9 which control the activation of a conventional vibrator device 94 which is connected to a bed. The transistor Q8 will switch between conductive and nonconductive states in accordance with the output of transistor Q1. Capacitor C11 integrates the output of transistor Q8 and provides a continuous DC input to transistor Q9 whenever a flashing sequence is present. Transistor Q9, when switched to the conductive state, energizes relay K2 which, through its associated contact, connects power to the vibrator causing its energization. Since vibrators are typically motor driven devices, they cannot be made to switch on and off at the same rate as lights can be made to flash. Thus, the vibrator 94 is held on continuously whenever a sound producing event is detected so as to wake up the person sleeping in the bed. The lights then provide the desired visual indication of which sound producing event has taken place.

The various pulse sequences, present at the output of transistor Q1 which is connected as an input to NOR gate 96 in FIG. 5, control the operation of a transmitter circuit, shown generally by reference number 54 in FIG. 5. Also input to NOR gate 96 on control line 110 is an input from a switch S2, shown in FIG. 6. The switch S2 is located on the front of the central logic unit 18, as shown in FIG. 1, and provides the means for inhibiting the remote control units such that only the light 92 connected to the central logic unit 18 will flash when a sound producing event has been detected. With switch S2 in the position shown in FIG. 6, a low level signal will be input on control line 110 to NOR gate 96, FIG. 5, thereby permitting the transmitter 54 to switch or follow the state of transistor Q1, as described above. When the switch S2 is changed to its other position, a high level signal is input on control line 10 to NOR gate 96 which holds the output of NOR gate 96 at a low level thereby inhibiting generation of the carrier signal from the transmitter circuit 54. In addition, an indicating light L2 which is mounted on the front of the central logic unit 18 is energized, thereby providing an indication that the remote control unit has been de-activated.

The central control unit 18 includes another switch, labelled S1, which is also mounted on the face of the control unit 18 and provides a means for disabling selected ones of the remote sensors, such as those associated with a telephone, doorbell or a door knock. In this manner, a person when desiring to take a nap can de-activate those sensors that would normally interrupt his sleep. With the switch S1 in the position shown in FIG. 6, a low level signal is input to NOR gate 112, the output of which, on control line 114, will be at a high logic level. Control line 114 is connected to the clear inputs of timers T2 and T3, shown in FIG. 4, which are associated with the telephone and the doorbell or door knock sensors, respectively. Thus, with switch S1 in the position shown, timers T2 and T3 are activated so as to respond to inputs from the sensors associated with the telephone or doorbell. When the switch S1 is changed to its other position, a high level signal is input to NOR gate 112 which holds the output of NOR gate 112 at a low logic level thereby inhibiting timers T2 and T3 from operation even if an input signal is received from the sensors. In addition, indicating light L1 will be activated so as to indicate that two of the remote sensors have been de-activated.

As shown in FIG. 5, and described above, the output of transistor Q1 switches between conductive and non-conductive states in accordance with the sequence of pulses generated by the circuitry shown in FIG. 4. The output of transistor Q1 is connected as an input along with the state of switch S2, to NOR gate 96. The output of NOR gate 96 is connected to the base terminal of transistor Q5 and controls the switching or transistor Q5 between conductive and nonconductive states. Thus, the output of NOR gate 96 will switch or follow the state of the pulse sequences thereby causing transistor Q5 to similarly switch between conductive and nonconductive states. Transistor Q5 controls the activation of a transmitter circuit 54 comprising a crystal oscillator Y1 and a transistor Q6, which produces a carrier signal at a frequency of 196 KHz whenever transistor Q5 is conducting. Transistor Q7 amplifies the output of transistor Q6 and thereby places the carrier signal which is switched on and off in accordance with the predetermined pulse sequence onto the power conductors 20 and 22 of the house via transformer D1. Although utilization of house wiring is preferred and is the least expensive mode of installation, it is also possible to hard wire the central logic unit 18 to the control modules or to utilize radio frequency transmitters and receivers even though such alternate methods are more expensive than the preferred use of existing house wiring.

Figure 7:
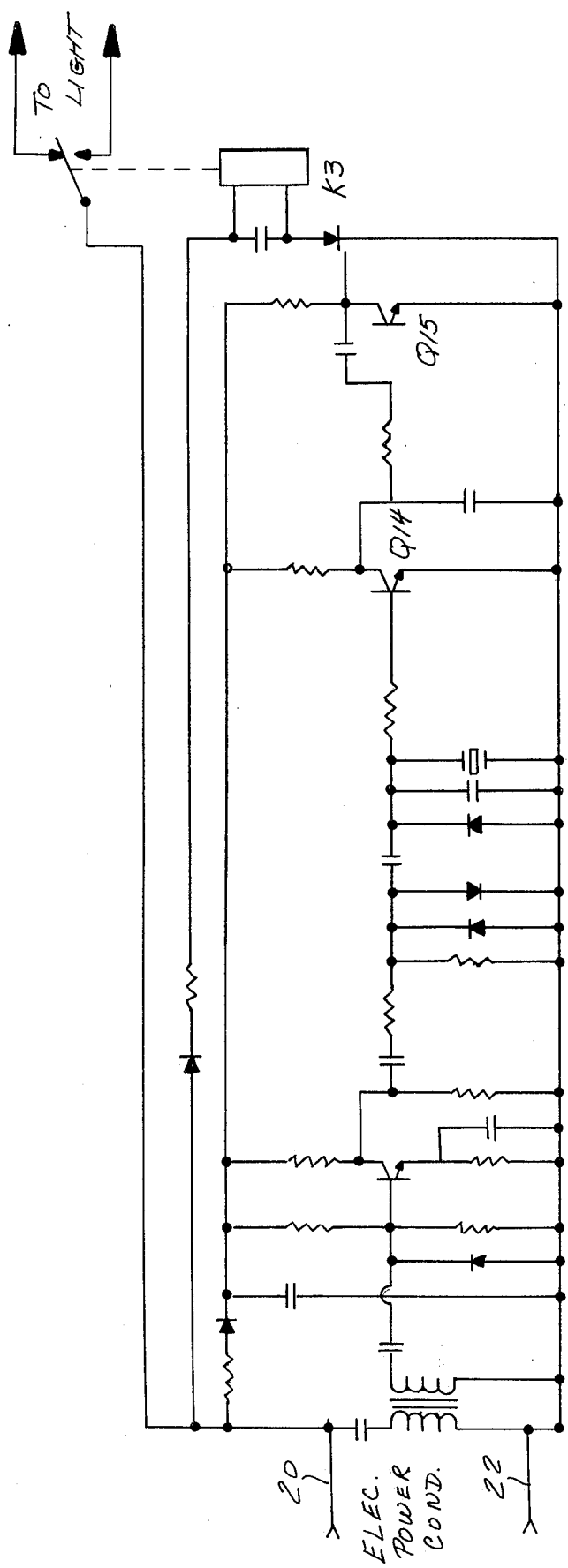
FIG. 7 is a schematic diagram of one of the control modules shown in FIG. 1.

As shown in FIGS. 1 and 2, and in greater detail in FIG. 7, the output from the transmitter section 54 of the central logic unit 18 is conducted via existing house power conductors 20 and 22 to a plurality of control modules, such as control modules 24 and 26. According to this invention, the control modules are of two basic types. The first version, illustrated by control module 24 in FIG. 1, includes means for plugging into a conventional electric outlet 28. An illuminating means, such as a light 32 is, in turn, plugged into the control module 24. With this version, the light 32 may be used only for signalling the occurrence of one of the predetermined sound producing events. The other version of the control module, as shown by control module 26 in FIG. 1, is also plugged into a conventional electrical outlet 30 and has an illuminating means, such as light 34, plugged into it. However, the control module 26 includes an on-off switch which enables the light 34 to be used for normal purposes; that is, the light 34 may be turned on and off as desired to provide lighting for the surrounding area. When the the light 34 is used in this manner, the flashing code that will be generated will be the reverse of that described above when the light 34 is already on for general lighting purposes.

Referring now to FIG. 7, there is shown the detailed circuitry of one of the control modules 24 or 26. The control module is plugged into a standard electrical outlet and receives power on electrical power conductors 20 and 22. Also the control module receives the carrier signal which comprises a plurality of pulses depicting the desired flashing code via the power conductors 20 and 22. This carrier signal is received and demodulated by conventional receiver circuitry shown in FIG. 7.

Thus, in operation, an audible sound from one of a plurality of sound producing devices, such as a telephone, a doorbell, fire detector, etc., will be detected by a sensor which has it sensitivity adjusted so as to detect only the particular range of audio signals produced by the sound producing device located adjacent thereto. The sensor, upon sensing the appropriate audio signals transmits a unique signal to central logic unit 18. Receiver circuitry within the central logic unit 18 receives the signals from the sensor modules and identifies which sensor module has been activated. Control circuitry within the central logic unit 18 generates a predetermined pattern or series of pulses which have been preassigned to indicate the occurrence of a particular sound producing device or event. This series of pulses is transmitted, preferably over existing house power conductors, to a plurality of control modules which are plugged into conventional outlets in the house. Illumination devices, such as lights, which are plugged into each control module, are controlled by the control module and will switch between on and off states in the predetermined pattern so as to indicate to persons having impaired hearing capability which one of a plurality of sound producing events is occurring within the house.

What is claimed is:

1. A visual signalling apparatus for hearing impaired persons adapted for use in a building having illuminating means, a source of electrical power and electrical power conductors for supplying electrical power from said source to said illuminating means, said visual signalling apparatus comprising:

a plurality of means for sensing audible sounds resulting from the occurrence of a one of a plurality of predetermined events, each of said sensing means being associated with a different one of said predetermined sound producing events, each of said sensing means producing a distinct first output signal upon sensing said audible sounds resulting from the occurrence of said associated predetermined event;

a central logic unit;

means for transmitting said first output signal from said sensing means to said central logic unit; and means adapted to be connected to said illuminating means, for controlling the state of said illuminating means;

said central logic unit including means for receiving said first output signal from said transmitting means and means for identifying which of said plurality of sensing means transmitted said first output signal;

said central logic unit including means for transmitting a distinct second output signal to said controlling means for each of said first output signals received from said sensing means, said distinct second output signal specifying one of a plurality of predetermined sequences of changes of state, each preassigned to one of said plurality of predetermined events, of said illuminating means so as to indicate the occurrence of one of said predetermined events;

said controlling means changing the state of said illuminating means according to said predetermined specific sequence in response to said second output signal from said central logic unit.

2. The visual signalling apparatus of claim 1 wherein the transmitting means includes a radio frequency transmitter and wherein the central logic unit includes a radio frequency receiver.

3. The visual signalling apparatus of claim 1 wherein the predetermined events include the activation of a fire detection means, burglar alarm means, telephone, doorbell, alarm clock, a person's voice and a knock on a door.

4. A visual signalling apparatus for hearing impaired persons adapted for use in a building having illuminating means, a source of electrical power and electrical power conductors for supplying electrical power from said source to said illuminating means, said visual signalling apparatus comprising:

a plurality of means for sensing audible sounds resulting from the occurrence of one of a plurality of predetermined events, each of said sensing means being associated with a different one of said predetermined sound producing events, each of said sensing means producing a distinct first output signal upon sensing the audible sounds resulting from the occurrence of said associated predetermined event, said first output signals from the sensing means having a predetermined priority ranking;

a central logic unit;

means for transmitting said first output signals from said sensing means to said central logic unit; and means adapted to be connected to said illuminating means, for controlling the state of said illuminating means;

said central logic unit including means for receiving said first output signals from said transmitting means and means for identifying which of said plurality of sensing means transmitted said first output signal;

said central logic unit including means for transmitting a second output signal to said controlling means for each of said first output signal received from said sensing means, said distinct second output signal specifying one of a plurality of predetermined sequences of changes of state, each preassigned to one of said plurality of predetermined events, of said illuminating means so as to indicate the occurrence of one of said predetermined events;

said controlling means changing the state of said illuminating means according to said predetermined specific sequence in response to said second output signal from said central logic unit.

5. The visual signalling apparatus of claim 1 wherein the central logic unit is adapted to be connected to the electrical power conductors in a house and includes means for transmitting the second output signal onto said electrical power conductors; and wherein the controlling means is adapted to be connected to said electrical power conductors and includes means for receiving said second output signal from said central logic unit on said electrical power conductors.

6. The visual signalling apparatus of claim 1 further including:

a plurality of illuminating means; and a plurality of controlling means, each associated with one of said illuminating means and responsive to the second output signal from the central logic unit, for controlling the changes of state of said associated illuminating means.

7. The visual signalling apparatus of claim 1 wherein the controlling means further includes switch means for manually changing the state of the illuminating means independent from the second output signal from the central logic unit.

8. A visual signalling apparatus for hearing impaired persons comprising:

a plurality of means for illuminating various portions of a building;

a source of electrical power;

electrical power conductors for supplying electrical power from said source to said illuminating means;

a central logic unit connected to said electrical power conductors;

a plurality of means for sensing audible sounds resulting from the occurrence of predetermined events within said building, each of said sensing means being associated with one of the said predetermined events, each of said sensing means including transmitter means for transmitting a distinct first output signal to said central logic unit upon sensing said audible sounds associated with the occurrence of said associated predetermined event;

said central logic unit including receiver means for receiving said first output signals from said sensing means and means for identifying which of said sensing means sent said first output signal; and a plurality of means, each connected between said electrical power conductors and one of said illuminating means, for controlling the changes of state of said illuminating means connected thereto;

said central logic unit further including means for transmitting a distinct second output signal on said electrical power conductors to said controlling means, said second output signal providing one of a plurality of distinct sequences of changes of state of said illuminating means for each first output signal received from said sensing means so as to enable said hearing impaired persons to determine which of said sound producing events is taking place;

said connecting means including means for receiving said second output signal from said central logic unit on said electrical power conductors and for changing the state of said illuminating means connected thereto in accordance with said second output signal.

* * * * *